Figure 1:
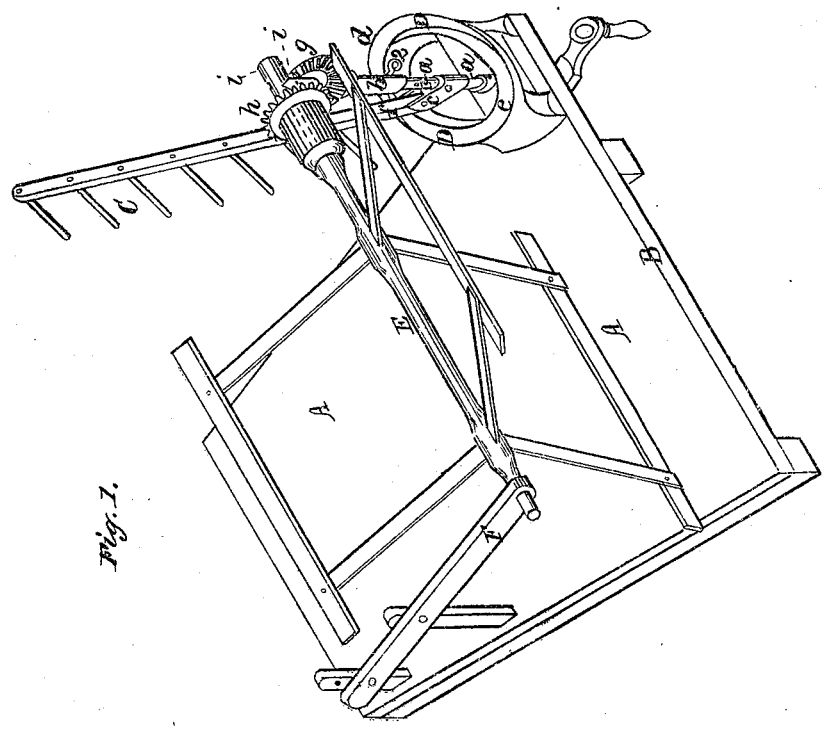

W. A. Wood,
Harvester Rake

No. 40,876

Patented Dec. 8, 1863.

Witnesses
E. Evans Jr.
P. E. Willem

W. A. Wood
By atty A. B. Stoughton

UNITED STATES PATENT OFFICE.

W. A. WOOD, OF HOOSICK FALLS, NEW YORK.

IMPROVEMENT IN COMBINED RAKE AND REEL FOR HARVESTERS.

Specification forming part of Letters Patent No. 40,876, dated December 8, 1863.

*To all whom it may concern:*

Be it known that I, W. A. WOOD, of Hoosick Falls, in the county of Rensselaer and State of New York, have invented certain new and useful Improvements in Combined Rake and Reel for Harvesting-Machines; and I do hereby declare that the following is a full, clear, and exact description of the construction and operation of the same, reference being had to the accompanying drawings, making a part of this specification, in which—

Figure 1 represents in perspective a view of a platform or table of any ordinary harvesting-machine, to which my improvement is attached.

I am aware that a rake and reel have been so united as that the rake would revolve around the reel-shaft with the reel, the motions of each being necessarily continuous, and thus the rake would sweep off the platform at every revolution of the reel regardless of the quantity of cut grain upon it. In my invention the rake does not revolve around the reel, nor around the reel-shaft. Its circuit is entirely different from that of the reel, and not over the same space, and yet it works in perfect harmony with the reel whether its motion be continuous or intermittent. In my case the rake is located under the main-frame end of the reel. It is moved around by a vertical shaft driven from the main gear of the harvester, while it receives a rising-and-falling motion during its circuit from a cam arranged around its shaft. When at its highest elevation it is entirely clear of the reel. When at its lowest position it is under the reel and raking the gavel from the platform or table. It strikes in between the blades and arms of the reel without clashing or interlocking with them.

To enable others skilled in the art to make and use my invention, I will proceed to describe the same with reference to the drawings.

A represents a grain table or platform, of which the side B is the front, or that part to which the guards and cutting apparatus are affixed in any of the usual well-known ways.

On the front of the table or platform A, and next the main frame of the harvesting-machine, is an upright shaft, *a*, to which motion is given by any suitable gear connecting it with the main drive-wheel or its axle or journal; and to this shaft *a* is connected, by a yielding or flexible joint, *c*, a rake, C.

Around the shaft *a* there is a cam, D, whose highest elevation is at *d*, and its lowest depression at *e*. The rake-stale *f* rests upon this cam D, and while it receives a rotating motion from the shaft *a* it also receives a rising-and-falling motion from the cam D.

As shown in the drawings, the rake would have a continuous motion; but I propose to place a clutch where the rake is connected to the shaft *a*, so that it may be thrown into and out of action at the will of the driver or operator from his seat on the machine, so that a uniform gavel may at all times be delivered from the grain-table onto the ground.

On top of the shaft *a* there is a sleeve or boss, *b*, which is adjustable on said shaft, and, when adjusted, firmly held thereto by a pin, 2, passing through a hole therein, and also a hole in the shaft, of which there may be a series, as at 3. The object of this adjustment is to raise and lower the reel when necessary.

To the top of the sleeve or boss *b* is affixed a bevel-gear, *g*, which may take into and turn the bevel-gear *h* on the end of the reel-shaft E, so as to give motion to said reel-shaft and the arms and blades upon it. The upper journal of the shaft *a* and the inner journal of the reel-shaft E are supported in a T-shaped piece, *i*, which affords bearings for the journals of each of these shafts. The outer end of the reel-shaft E is supported in a reel-post, F, which may also be made adjustable, so that the reel may be raised or lowered, as may be required.

The rake is so geared and timed as to pass in between the blades of the reel without coming in conflict with them and sweep the platform, and it always retains this relative position to the reel whether it runs continuously or whether it is stopped by throwing out the clutch, for the clutch always gears at a fixed point and at no other, and thus there is no conflict between the reel and the rake at or over such portions of their circuit as may fall within the same space or cross each other. Driving the rake and the reel from the same gear facilitates their harmonious movements; but the reel may be driven otherwise, and yet the movements of the two things be perfectly regulated and timed though independent of each other.

The rake, in addition to its sweeping the platform and delivering the gavel in good shape upon the ground, reaches forward into the standing grain and draws it toward the reel after making a complete separation between that which it draws in and that which is left standing.

Having thus fully described the object and purpose of my invention, what I claim therein as new, and desire to secure by Letters Patent, is—

The combination of an independent rake and reel, when arranged to work together substantially in the manner and for the purpose herein set forth.

W. A. WOOD.

Witnesses:
J. RUSSELL PARSONS,
LEN. KING.